(12) United States Patent
Blayvas (10) Patent No.: US 10,386,792 B2
(45) Date of Patent: Aug. 20, 2019

(54) SENSORY SYSTEMS FOR AUTONOMOUS DEVICES

(71) Applicant: ANTS TECHNOLOGY (HK) LIMITED, Wanchai (HK)

(72) Inventor: Ilya Blayvas, Rehovot (IL)

(73) Assignee: ANTS TECHNOLOGY (HK) LIMITED, Wanchai (HK)

( * ) Notice: Subject to any disclaimer, the term of this patent is extended or adjusted under 35 U.S.C. 154(b) by 290 days.

(21) Appl. No.: 15/297,146

(22) Filed: Oct. 19, 2016

(65) Prior Publication Data

US 2018/0106885 A1  Apr. 19, 2018

(51) Int. Cl.
| | |
|---|---|
| G05B 13/02 | (2006.01) |
| G01S 13/93 | (2006.01) |
| G01S 13/86 | (2006.01) |
| G01S 7/41 | (2006.01) |
| G01S 17/02 | (2006.01) |
| G01S 13/72 | (2006.01) |

(52) U.S. Cl.
CPC ............... *G05B 13/02* (2013.01); *G01S 7/41* (2013.01); *G01S 13/723* (2013.01); *G01S 13/862* (2013.01); *G01S 13/865* (2013.01); *G01S 13/867* (2013.01); *G01S 13/931* (2013.01); *G01S 17/026* (2013.01)

(58) Field of Classification Search
None
See application file for complete search history.

(56) References Cited

U.S. PATENT DOCUMENTS

| | | | | |
|---|---|---|---|---|
| 6,812,835 | B2 * | 11/2004 | Ito | G08B 13/19604 340/541 |
| 2005/0062615 | A1 * | 3/2005 | Braeuchle | B60K 31/0008 340/903 |
| 2007/0286475 | A1 * | 12/2007 | Sekiguchi | G06K 9/00369 382/154 |
| 2014/0035775 | A1 * | 2/2014 | Zeng | G01S 13/867 342/52 |
| 2014/0218228 | A1 * | 8/2014 | Noda | G01S 13/584 342/147 |
| 2014/0241581 | A1 * | 8/2014 | Narayanan | G06T 7/20 382/103 |
| 2017/0038466 | A1 * | 2/2017 | Salmen | G01S 17/89 |

* cited by examiner

*Primary Examiner* — John C Kuan
(74) *Attorney, Agent, or Firm* — Soroker Agmon Nordman (57) ABSTRACT

A method of training a heterogeneous sensory system, including: accepting data of an environment from a first sensor, identifying objects in the data from the first sensor by a first processing unit, accepting data of the environment from a second sensor corresponding to the data of the first sensor, identifying objects in the data from the second sensor by a second processing unit, comparing the identified objects from the first processing unit and the corresponding objects from the second processing unit with a system processing unit, determining cases of discrepancies, between the objects identified in the data of the first sensor and not in the data of the second sensor or vice versa, tagging the data of the cases with discrepancies, storing the tagged data in a training buffer; and training the first processing unit and/or the second processing unit with the data stored in the training buffer.

11 Claims, 2 Drawing Sheets

SENSORY SYSTEMS FOR AUTONOMOUS DEVICES

TECHNICAL FIELD

The present invention relates generally to the field of sensory systems and more particularly to sensory systems for robotic devices and especially autonomous robotic devices.

BACKGROUND

The category of autonomous robotic devices includes, among other things, autonomous vehicles of various sizes for transporting passengers and goods, pilotless airplanes and ships, drones, home robots, delivery robots, devices for indoor and outdoor cleaning, maintenance, construction and manufacturing.

The sensory systems for such devices include sensors for acquisition of data reflecting the properties of the surrounding environment and a processing unit for analyzing the measurements of the sensors and making decisions based on the measurements. Analyses and decision making has proven to be a long standing challenge for programmers and hardware manufacturers. Exponential progress in the fields of computational and sensor electronics, robotics and algorithms has resulted in successful solutions to some long standing challenges in the field of autonomous robot navigation.

Known solutions make use of mono and stereo vision sensors, active and passive RADAR (radio-wave detection and ranging), LIDAR (light distance and ranging), SONAR (sound navigation and ranging), touch sensors and other sensors.

However the autonomous robot device industry is yet in its infancy and a lot of progress is required to create truly useful, reliable and efficient autonomous robotic devices.

SUMMARY

An exemplary embodiment of the disclosure, tackles two important challenges of modern sensory systems: Synergetic integration of several different sensor subsystems within a heterogeneous sensor system and the continued on-line training of the sensor system after its deployment and during its operation in the product.

Conventionally the design of an autonomous robotic device implies selection of a certain sensory system, believed to be the most suitable for the selected autonomous device, the domain of its application and constrained by available technologies and system cost.

In most cases the selection of a single sensory system sacrifices some properties of the autonomous device and/or its ability to operate in certain conditions. For example the compromise between selection of a visual or a RADAR sensory system for an autonomous vehicle, the visual system may fail on detection and recognition of certain objects, fail in heavy rain or fog, and err in the distance estimation, while the RADAR system may err for certain other objects, may be more power-consuming, have lower resolution, have limited distance range and refresh speed, and will be blind to important visual clues such as color for recognition of traffic lights and traffic signs.

A combined sensory system of two or more different types is referred to in the disclosure as a heterogeneous sensory system, while specific sensors within it and their corresponding hardware and algorithms for processing the output of the specific sensor are referred to as a sensory sub-system. Naive combining of different sensory sub-systems constitutes only a partial solution, increasing price, space and power consumption, and sometimes providing mutually contradicting outputs in return.

In an exemplary embodiment of the disclosure, a synergetic merge of sensory sub-systems into an efficient heterogeneous sensory system is described:

Various disclosed ways of integration and operation of the sensory systems include:

(1) Merge of their outputs at the level of environment maps, detected and recognized objects, where two or more outputs are utilized to (a) increase the domain of operation conditions, (b) reduce the amount of false-detections and missed objects (c) increase confidence levels and accuracy of measurements;

(2) Sensory system control, where the various sensory sub-systems are activated and deactivated when necessary, or have an adaptive awareness level in accordance to the state of the microenvironment and detections by other operating sensory sub-systems. A heterogeneous control sensory system comprising two or more different sensory sub-systems, where at least one of the sensory sub-systems can be operated in two or more awareness modes as well as the control system for controlling the transition between awareness modes are disclosed;

(3) Object detectors in general, and Deep Neural Network detectors in particular are designed trained and operated to receive input data from two or more sensory sub-systems and to perform processing for the sake of object detection or recognition on the combined data. Optionally architectures can combine the sensory sub-systems at both output and internal layers.

Another subject of this disclosure are the methods of training of sensory systems and sub-systems. The sensory system comprises a sensor, such as video camera, RADAR, SONAR or 3D scanner, and a detector, which is configured to receive input from the sensor and detect certain predefined objects from this input. The detector is conventionally trained offline, prior to its use in the system on the earlier recorded and hand-marked examples and situations. However the conditions in the field may differ, due to different illumination and weather conditions, modifications of the sensor, and of the objects.

Consider for example pedestrian detection trained for pedestrians in Canada in the winter on a new and clean camera, and later operated in the central Africa on the different model of the camera, after several days of off-road driving. The change in the image quality, camera parameters, appearance of the background, appearance and dressing of the pedestrians will most likely degrade the detector performance. Therefore the ability to train, re-train or fine tune the detectors in-field is of crucial importance. The current disclosure describes methods allowing in-field training of the detectors:

(1) In some embodiments the object detection by one sub-system is used to train and improve performance of another sub-system; a confident detection on the system level allows training and improvement of the sub-systems;

(2) In other embodiments the sensor raw data is stored in a temporary buffer, and the object is tracked from the frames where it was detected to the frames acquired at earlier or later times; the frames where the object was tracked and localized with the tracker, but not found earlier with the detector alone are used for training sensory subsystems.

(3) In some embodiments the location of the object detected by one of the sub-systems is used to enhance the confidence level of the object existence suggested by other sub-system (4) In some embodiments the location of the object detected by one of the sub-systems is used to train the other sub-system (5) In some embodiments the object detected in certain time moment is traced further in time or backward in time through the pre-recorded inputs and its location during other moments in time is used to train the object detectors.

(6) In some embodiments the threshold level of the object detector in some sub-systems is adapted depending on the detection confidence level of the other sub-systems (7) In some embodiments the threshold level of the object detector is adapted depending on the system state and/or prior detections and/or state of the environment There is thus provided according to an exemplary embodiment of the disclosure, a method of training a heterogeneous sensory system, comprising:

receiving data of an environment from a first sensor;

identifying objects in the data from the first sensor by a first processing unit;

receiving data of the environment from a second sensor corresponding to the data of the first sensor;

identifying objects in the data from the second sensor by a second processing unit;

comparing the identified objects from the first processing unit and the corresponding objects from the second processing unit with a system processing unit;

determining cases of discrepancies, between the objects identified in the data of the first sensor and not in the data of the second sensor or vice versa;

tagging the data of the cases with discrepancies;

storing the tagged data in a training buffer; and training the first processing unit and/or the second processing unit with the data stored in the training buffer.

In an exemplary embodiment of the disclosure, the system processing unit analyzes the discrepancies and concludes in each case if the first processing unit or the second processing unit was more accurate in identifying the object. Optionally, in each case the object identification from the sensor whose processing unit was more accurate and the sensor data from the sensor whose processing unit was less accurate are used to train the processing unit that was less accurate. In an exemplary embodiment of the disclosure, at least one of the sensors and/or processing units have multiple levels of awareness and the levels of awareness are adjusted responsive to analysis of the data from the sensors. Alternatively or additionally, at least one of the sensors and/or processing units have multiple levels of awareness and the levels of awareness are adjusted responsive to the determination of cases of discrepancies. Alternatively or additionally, at least one of the sensors and/or processing units have multiple levels of awareness and the levels of awareness are adjusted responsive to environmental conditions that affect the measurements of the first sensor and/or the second sensor. Alternatively or additionally, at least one of the sensors and/or processing units have multiple levels of awareness and the level of awareness of the first sensor and/or the second sensor is lowered in an eventless environment. Alternatively or additionally, at least one of the sensors and/or processing units have multiple levels of awareness and the level of awareness of the first sensor and/or the second sensor is lowered if the received data is expected to be eventless. Alternatively or additionally, at least one of the sensors and/or processing units have multiple levels of awareness and the level of awareness of the first sensor and/or the second sensor is lowered if the received data is unreliable. Alternatively or additionally, at least one of the sensors and/or processing units have multiple levels of awareness and if the level of awareness of the first sensor is lowered then the level of awareness of the second sensor is raised and vice versa.

In an exemplary embodiment of the disclosure, in case of a discrepancy checking the current data of one of the sensors with previous data of the sensor to identify inconsistencies in tracking objects between the data of the sensor over time. Optionally, the objects are tracked forward in time from a state where it was last identified. Alternatively or additionally, the objects are tracked backward in time from a state where it was first identified. In an exemplary embodiment of the disclosure, the objects are tracked using the data from at least one more sensor.

There is further provided according to an exemplary embodiment of the disclosure, a heterogeneous sensory system, comprising:

a first sensor for accepting data of an environment;

a first processing unit that receives the data from the first sensor and is configured to identify objects of the environment;

a second sensor for accepting data of the environment corresponding to the data of the first sensor;

a second processing unit that receives the data from the second sensor and is configured to identify corresponding objects of the environment;

a system processing unit for comparing the identified objects from the first processing unit and the corresponding objects from the second processing unit; wherein the system processing unit is programmed to determine cases of discrepancies, between the objects identified in the data of the first sensor and not in the data of the second sensor or vice versa; and wherein the system processing unit is further programmed to tag the data of the cases with discrepancies, store the tagged data in a training buffer; and train the first processing unit and/or the second processing unit with the data stored in the training buffer.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale such that each element or part may be larger or smaller than actually shown.

DETAILED DESCRIPTION

Figure 1:
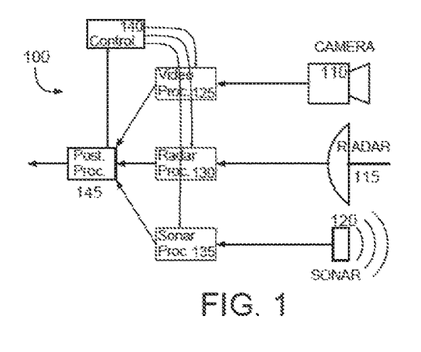
FIG. 1 is a schematic illustration of a heterogeneous sensory system for autonomous robotic devices, according to an exemplary embodiment of the disclosure.

FIG. 1 is a schematic illustration of a heterogeneous sensory system 100 for autonomous robotic devices, according to an exemplary embodiment of the disclosure. In an exemplary embodiment of the disclosure, system 100 includes multiple heterogeneous sensors for acquiring information about the surrounding environment. The sensors may include a camera 110 (e.g. video camera), a RADAR (RAdio Detection And Ranging) 115, A SONAR (SOund Navigation And Ranging) 120 and/or other sensors. Optionally, each sensor is connected to a processing unit, for example processing unit 125 that processes video recordings and optionally deals with object detection, recognition, segmentation, image tracking and/or other operations on a video stream acquired by camera 110. Processing unit 130 deals with analysis of the measurements of RADAR 115 providing, for example a 3D map of the environment within its field of view including distances to objects and object detection. Processing unit 135 processes signals from SONAR 120, for example also providing a 3D map of the environment within its field of view including distances to objects and object detection.

In an exemplary embodiment of the disclosure, a system level processing unit 145 receives the output of the sensor specific processing units (125, 130, 135), analyzes the information and derives more accurate information, for example by combining the information from more than one sensor in determining position and motion of any objects in the field of view of the sensors (110, 115, 120). By combining information, system 100 can overcome limitations that effect a specific type of sensor, for example poor visibility or other interferences.

In an exemplary embodiment of the disclosure, system 100 includes a control unit 140 that controls the sensor processing units (125, 130, 135), for example activating, deactivating, aiming the sensor or altering sensing parameters. In some embodiments of the disclosure, system 100 can include one or more sensors.

System 100 may include only some of the sensors (110, 115, 120) listed above, different sensors or additional sensors. Optionally, system 100 may include multiple sensors of the same type with the same or different parameters, for example multiple cameras with different settings or with the same settings to form stereo sensors. Alternatively or additionally, system 100 may include additional sensors such as LIDAR (Light Detection And Ranging) or may include communication transceivers (e.g. RF, Bluetooth, WI-FI) to communicate with remote sensors, other robotic devices, road or infrastructure sensors and the like. Optionally, system 100 may include sensors that are adapted to function better in the air (airborne), underwater (marine) or other domains. System 100 may be installed in autonomous vehicles, boats, airplanes, drones, home robots (e.g. for cleaning), autonomous robots for search and rescue, construction and other operations.

In an exemplary embodiment of the disclosure, each sensor (110, 115, 120) includes the hardware and software required to provide raw information of the environment, for example a video flow from camera 110, a 3D flow from the RADAR 115 or SONAR 120. Likewise processing units (125, 130, 135) include the hardware and/or software required to analyze the raw information provided by the sensors (110, 115, 120) and optionally, perform pattern recognition, object detection, segmentation, tracking and other related algorithms.

Consider as a first example an autonomous vehicle. Its sensory system is required to detect the obstacles along its way, cars, pedestrians, evaluate the distance towards them and estimate the time to collision. It should also detect and recognize road signs and traffic signs, traffic lights, lane markings and ego-lane for self-motion, intersections and all the road structures and object that are related and can be related to the driving and navigation.

The sensory system must reliably operate also in adverse visibility conditions such as night, rain, fog. Consider the autonomous vehicle sensory system 100 comprising a video camera 110 and a RADAR 115. Where the video camera 110 is used for object, road and lane detection, and RADAR 110 is used for 3D information for object segmentation, verification, obstacle detection, road recognition and verification, distance and speed measurements etc.

Consider as a second example a household robot, dedicated for home cleaning, with possible advanced missions such as collecting the dirty dishes into the dishwasher, and dirty clothes into the washing machine. Such a robot needs to detect obstacles, and the subjects that need to be collected, as well as handle unexpected situations such as accidental splash of soup on a table or careless placement of a dirty sock on the floor.

A sensory system of such a home robot can comprise various sensor subsystems including for example a video camera 110 and a stereo vision subsystem (e.g. using a second video camera, a pair of cameras or a camera with a pair of lenses). Optionally, the video camera 110 is based on a wide-angle camera and used for orientation, navigation, object detection, scene analysis, event detection and understanding, while the stereo vision subsystem uses a narrow angle pair of cameras that is used for accurate estimation of distances and sizes, obstacle detection, object segmentation etc. The stereo vision subsystem is directed towards the objects and obstacles identified by the first (mono) camera 110, or in the direction where the mono camera 110 failed to recognize or separate a particular object or obstacle.

Figure 2:
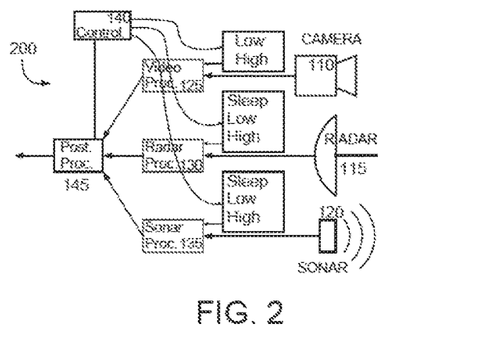
FIG. 2 is a schematic illustration of an adaptive sensory system comprising subsystems with adaptively changing awareness levels for autonomous robotic devices, according to an exemplary embodiment of the disclosure.

FIG. 2 is a schematic illustration of an adaptive sensory system 200 comprising subsystems with adaptively changing awareness levels for autonomous robotic devices, according to an exemplary embodiment of the disclosure. In an exemplary embodiment of the disclosure, adaptive sensory system 200 is similar to system 100 comprising multiple sensors, for example camera 110, RADAR 115 and SONAR 120. Additionally, adaptive sensory system 200 includes processing units 125, 130 and 135 to respectively analyze the information provided by the sensors (110, 115 and 120). In an exemplary embodiment of the disclosure, adaptive sensory system 200 further includes the system level processing unit 145 that receives the output of the sensor specific processing units (125, 130, 135) and combines the information. Additionally, adaptive sensory system 200 includes control unit 140 that controls the sensor processing units (125, 130, 135). In an exemplary embodiment of the disclosure, some of the sensors (110, 115, 120) have multiple levels of awareness such as:

"sleep", when the sensor is disabled or depowered;

"low" when the sensor operates at a lower level of power consumption, e.g. lower resolution, lower refresh rate and/or lower processing burden;

"normal" when the sensor operates at a standard rate from which it can be reduced or enhanced depending on the needs of adaptive sensory system 200;

"high" when the sensor operates at a higher resolution, refresh rate and processing burden.

Optionally, control unit 140 can alter the alertness level of any sensor responsive to detections of any of the sensors or ambiguities in detections of a sensor, for example if one sensor provides a problematic output another sensor may be activated at a higher rate or in response to a detection by one sensor another sensor may be turned on to examine the detection.

In one example an autonomous vehicle equipped with adaptive sensory system 200 comprises a video camera 110 and a RADAR 115. The RADAR 115 in the autonomous vehicle may be configured to be normally in a 'sleep' mode, or 'low' mode (reduced power and frame-rate), such that the vehicle sensory system is based on the information of the video camera 110. Optionally, the RADAR 115 sensor is transferred to the 'high' mode in response to certain conditions, such as:

1. Driving at a high speed;
2. Driving at night/in rain/in a fog or otherwise reduced visibility conditions;
3. Upon detecting a specific situation (e.g. road maintenance) or identifying a specific traffic sign (e.g. passing next to a playground, or detecting a sign warning of the presence of children);
4. In a case that the adaptive sensory system 200 has low-confidence in the detections of the camera 110, e.g. if it receives an indication that there may be a problem with the quality of the pictures due to a hardware problem.

Optionally, once the situation and visibility conditions return to normal the RADAR 115 may be stepped back down to the 'low' or 'sleep' mode.

In another example an autonomous drone is equipped with a video system (e.g. a camera 110) and an active 3D scanner. Optionally, the 3D scanner can be of any type such as structured light, time-of flight, SONAR, RADAR or other types. Power consumption is of crucial importance for drones, due to the weight-constrained size of the battery and a requirement to extend operation time. The power consumption of the 3D scanner is significant and higher than that of the video system, however the accuracy and reliability of the 3D scanning system can be higher in many practical cases, such as when examining smooth featureless surfaces or regular patterns. Thus, the sensory system of the drone is normally operated only with an active video sub-system (e.g. camera 110), while the 3D scanner is set to be in sleep mode. However, when presence of an obstacle in the vicinity is detected, or during mission critical operations, such as landing, or in an ambiguous environment where the vision system provides a low-confidence interpretation of the scene, the 3D scanner is switched into an active 'high' operation mode to assist in correctly evaluating the environment.

Figure 3:
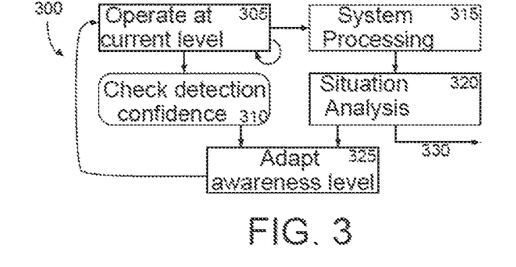
FIG. 3 is a flow diagram of an operation workflow for a control unit of an adaptive sensory system, according to an exemplary embodiment of the disclosure.

FIG. 3 is a flow diagram 300 of an operation workflow for a control unit 140 of adaptive sensory system 200, according to an exemplary embodiment of the disclosure. Optionally, adaptive sensory system 200 initially operates (305) at a specific level. In an exemplary embodiment of the disclosure, the information from the sensors (e.g. 110, 115, 120) are examined (310) to determine a confidence level for each sensor, for example by checking the information to see if it complies with specific rules. Optionally, if the confidence level of a sensor deteriorates below a preselected threshold value then controller 140 is instructed to adapt (325) an awareness level of the examined sensor. In an exemplary embodiment of the disclosure, the sensors are further examined (315) at the system level, which checks for compliance of the information from each sensor relative to each other or based on previous measurements of the same sensor. Optionally, the performance of the system is analyzed (320) to determine if the performance of the system has deteriorated below a preselected threshold value then controller 140 is instructed to adapt (325) an awareness level of some of the sensors, e.g. raise the awareness level of the sensor whose confidence level deteriorated or raise the awareness of a different sensor to compensate for the deterioration of a specific sensor. Optionally, the results of adaptive sensory system 200 are output (330) to drive a robotic device.

In an exemplary embodiment of the disclosure, heterogeneous sensory system 100 and/or adaptive sensory system 200 can be designed to improve their performance during field operation. Conventionally, the algorithms for using the sensors in the robotic device are pre-trained before deployment into the robotic device for use with specific environments. In contrast, heterogeneous sensory system 100 and/or adaptive sensory system 200 can be designed and programmed to be continuously trained to improve functionality during operation of the robotic device as explained below.

Figure 4:
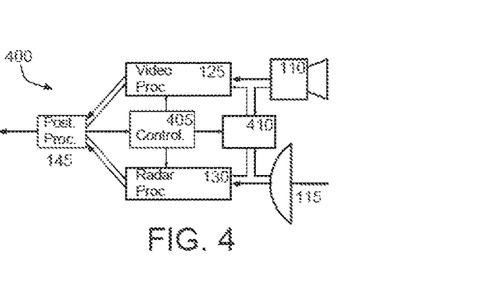
FIG. 4 is a schematic illustration of a block scheme for a heterogeneous sensory system with mutual training of the sensory sub-systems, according to an exemplary embodiment of the disclosure.

FIG. 4 is a schematic illustration of a block scheme for a heterogeneous sensory system 400 with mutual training of the sensory sub-systems, according to an exemplary embodiment of the disclosure. In an exemplary embodiment of the disclosure, system 400 includes two or more sensors, for example a camera 110 and a RADAR 115. Optionally, each sensor includes a processing unit, e.g. 125 and 130 (as in FIG. 1) respectively. In an exemplary embodiment of the disclosure, system 400 further includes a system processing unit 145 for processing the information from the sensors at the system level, for example analyzing the combined information from the camera 110 and the RADAR 115 to perform object detection boosting based on both sensors, tracking, scene analysis and other calculations. Optionally, the system processing unit 145 compares information from each sensor from corresponding time frames and/or corresponding locations, wherein it is expected to find correlation between the determinations from both sensors.

Optionally, in a case that an object was detected by one of the sub-systems (e.g. sensor 115) and missed by another sub-system (e.g. sensor 110), and a true positive or true negative was verified at the system level (e.g. by processing unit 145), these cases and their true meaning are added to a training set for training the erring sub-system. For this the raw sensor data is continuously stored in a buffer 410. Optionally, in a state where one of the sensors (110, 115) had a system-level verify fail, the corresponding sensor data is tagged for further training, while the untagged data is continuously discarded to free memory for an accumulating training set.

In an exemplary embodiment of the disclosure, when the system resources are available for training, and a sufficient number of examples have been tagged and accumulated in the training set buffer 410, the system may be trained on those examples. Optionally, the training is controlled by a control module 405, and the sensor raw data for training is taken from the buffer 410, while the true meaning is provided by the system level processing unit 145.

Figure 5:
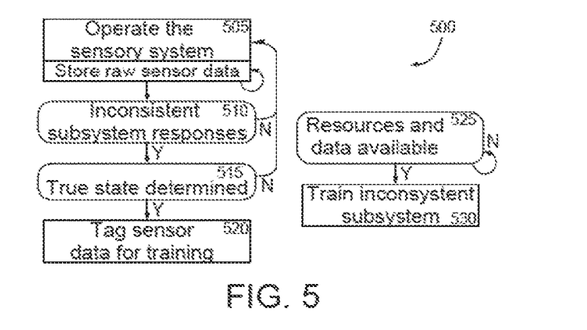
FIG. 5 is a flow diagram of an operation workflow for mutual training of a heterogeneous sensory system, according to an exemplary embodiment of the disclosure.

FIG. 5 is a flow diagram of an operation workflow 500 for mutual training of heterogeneous sensory system 400, according to an exemplary embodiment of the disclosure. In an exemplary embodiment of the disclosure, Module 505 denotes the continuous operation of heterogeneous sensory system 400 with simultaneous storage of the sensor raw data in buffer 410. Optionally, raw data means the data before performing object detection (e.g. in system processing unit 145). The raw data can be used for object detection or training of the object detector (confirming existence of a corresponding verification for the object). Optionally, the sensory data is stored in buffer 410, and unused data can be deleted when necessary to release space. In an exemplary embodiment of the disclosure, module 510 analyses responses of the sensory subsystems (e.g. 110 and 115). Optionally, when the responses are consistent the sensory data is not relevant for training and usually discarded, however if inconsistencies are detected then the data may be used to train the system 400. Optionally when one subsystem detects an object and another concludes the absence of the object, one of subsystems is necessarily wrong. In an exemplary embodiment of the disclosure, module 515 verifies if the true state was determined by the system. There are multiple ways in which the true state can be determined in the case of inconsistent responses between the subsystems, a few of which are presented in the examples below.

Consider car detection by RADAR 115 and video camera 110 under restricted visibility conditions and when in contrast the RADAR 115 detection has a high confidence level. Optionally, in that case the corresponding miss-detected area from the image (which may be blurred due to rain, fog, being dark due to low illumination, or generally degraded for other reasons) is used for training a visual detector in processor unit 145. Alternatively, consider a car detected by video camera 110, which occurs to be false positive from segmentation in 3D due to RADAR 115 or any other 3D scanning sub-system (e.g. due to 3D segmentation from a flat drawing on an advertisement billboard, or some other false positive detection that is discarded by 3D segmentation). This false positive example can be used to train, re-train or tune the video detection subsystem. In an exemplary embodiment of the disclosure, the relevant samples of raw sensor data, which are useful for detector training are tagged as ready for training in module 520. In FIG. 5 modules 525 and 530 denote a separate training thread, which is activated when the raw data that was identified, tagged and accumulated in modules 510-520 is ready for training and that the computational resources (e.g. module 405) are available for training. Numerous training strategies and methods are possible. One method includes storing an ever growing training set, re-training and fine-tuning the classifiers. In some embodiments the tagged data is scored so that the most important examples for weighted training are continuously used whereas others may be replaced.

Figure 6:
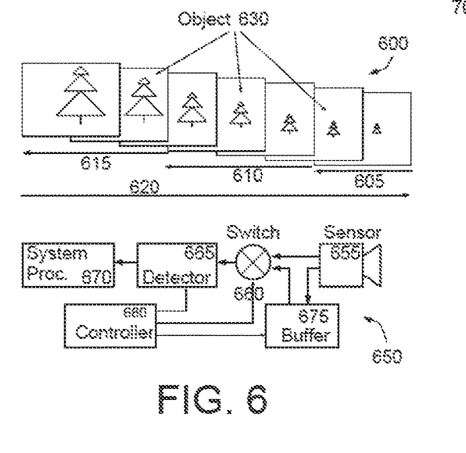
FIG. 6 is a schematic illustration of a set of recorded images for training a sensory system with tracking, according to an exemplary embodiment of the disclosure.
Figure 7:
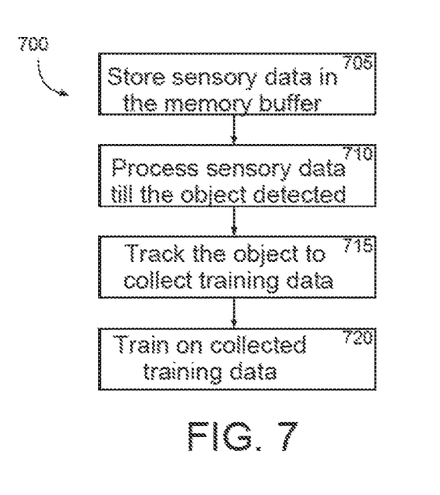
FIG. 7 is a flow diagram of an operation workflow for training of a sensory system with tracking, according to an exemplary embodiment of the disclosure.

FIG. 6 is a schematic illustration of a set of recorded images 600 for training a sensory system 650 with tracking, according to an exemplary embodiment of the disclosure; and FIG. 7 is a flow diagram of an operation workflow 700 for training sensory system 650 with tracking, according to an exemplary embodiment of the disclosure.

In an exemplary embodiment of the disclosure, sensory system 650 is designed to be trained to deal with missing objects in the set of recorded images 600. Optionally, the missing objects are detected by tracking from a true positive image (e.g. when an object 630 is detected with a high confidence level) towards a false negative image (e.g. missing the object 630). In an exemplary embodiment of the disclosure, a sensor 655 (e.g. a video camera or other sensor) provides the set of images 600 and stores the images (e.g. the raw sensor data) in a buffer 675. Optionally, a switch 660 is used to provide images into a detection module 665 either from sensor 655 or from buffer 675. In an exemplary embodiment of the disclosure, detection module 665 detects true positive images containing object 630. The object 630 is then tricked back towards false negative (with the object 630 missing) hinges from the set of images 600. Optionally, detection module 665 uses the false negative images to train the detection module 665 to better identify objects 630. Module 670 serves as a system processing unit to output information from sensory system 650 and module 680 controls the process, for example determining when to transfer images to detection module 665 from the sensor 655 and when to transfer from the buffer 675. Likewise control module 680 determines when to train the detection module 665 (e.g. when enough data has been accumulated).

In an exemplary embodiment of the disclosure, arrows 605, 610, 615 show the time flow direction of the frames in the set of images 600. In the set of images 600 object 630 is initially small and in subsequent frames in 605, 610, 615 the object 630 appears larger and larger. Initially in time flow 605 detection module 665 may have missed the object 630 completely. However in time flow 610 detection module may identify the object 630 but with a low confidence level. Finally in time flow 615 the object 630 is detected with a strong confidence level and with greater detail.

In an exemplary embodiment of the disclosure, the entire sequence 620 is stored in buffer 675, which then allows after the confident detection in time flow 615 to track back with the help of the tracking ability of sensory system 650 to time flow 610 and 605 and increase the confidence level in time flow 610 and 605. Optionally, tracking may be applied in reverse as in 620 with the set of images 600. In some embodiments of the disclosure, object 630 may be detected with great confidence in the initial images and then fade out or disappear in the forward direction and then reappear, for example due to fog or other interferences.

In some embodiments of the disclosure, when using a heterogeneous sensory system acquiring and storing two or more information channels from two or more different sensors, it might be the case that the object cannot be tracked based on the data acquired by any particular sensor, yet it can be tracked based on the mutual data of two or more channels. For example, consider tracking a black cat in a dark room, by a robot device equipped with a sonar sensor and an array of directional microphones. It is not easy to search for the black cat in the dark room even if the cat exists, and even if the robot sensory system is equipped with a video camera, since the images will be blurred and noisy. Detection by sonar is also problematic, since the cat's fur reflects the sound waves poorly. Detection by directional microphones is also problematic, since the cats can be pretty silent. Yet the combination of all three information channels, combined with prior knowledge on cat mechanics (e.g. assuming that this is not Lewis Carroll's Cheshire cat, and it cannot disappear, but its position and speed vector will be rather continuous quantities) can allow for a much better and more reliable result in tracking the cat. Optionally, the information from the different sensors complement each other for moments of unreliable data from some of the sensors. In some cases, information from the different sensors can be used to confirm measurements from other sensors, increase the detection confidence levels of measurements, detect false detections and optionally discard them.

FIG. 7 summarizes operation workflow 700 for sensory system 650 and the set of images 600 displayed in FIG. 6. Module 705 denotes the storage of raw sensory data during operation of the sensory system 650 in buffer 675. Modules 710 and 715 denote detection of the object 630 by sensory system 650, and tracking of the detected object 630 forwards or backwards to the images where the object 630 was not detected by sensory system 650 alone, without tracking. Images 600 together with identifying and labeling objects 630 in images deducted by the tracking procedure described above are tagged and stored in buffer 675 for further training of the detection module 665. Finally, block 720 denotes the training of the detector module 665 based on the collected training set.

In some embodiments of the disclosure, sensory system 650 may include more than one sensor 655. Optionally, when a discrepancy occurs between the data of one sensor and another, the data of one of the sensors or all of the sensors may be tracked as described above to determine if there are inconsistencies in the data of any of the sensors relative to previous data of the sensor.

In the disclosure below there are provided a few examples to demonstrate the ideas discussed above. In an exemplary embodiment of the disclosure, an autonomous vehicle is provided with a sensory system, for example a vision based system having a video camera 110. The video camera 110 samples the space in front of the vehicle, and transfers the recorded data as a video stream to processing unit 125. Processing unit 125 serves as a detector with computer vision software for processing the video stream received from the camera and detecting objects of interest, for example on a road in front of the vehicle snot as pedestrians crossing the road or on the side of the road e.g. on a sidewalk or road shoulders. Optionally, the components of the vision software include a detection algorithm that processes the acquired frames searching for pedestrians, and a tracking algorithm, which tracks the motion of every relevant pedestrian in sequential image frames of the video stream.

One of the problems with such a system is that in prior art systems the training of the processing unit 125 is performed before deployment of the system into the market. The specific examples of pedestrians used for training may significantly vary from those present in the environment where the system is used, for example due to different season of the year, type and color of the environment, different appearance of the pedestrians, dressing, color, etc. Consider a system developed and trained in a relatively dry climate such as Southern Israel and used in a rainy period in Central America or winter time in northern Europe or the arctic parts of Russia.

Optionally, such a system will have an increased error rate, although it will still detect the pedestrians in most cases. For those detections, the tracker algorithm is usually capable of tracking the pedestrian forward (or backward using the stored video input) towards the image frames where the detector algorithm fails to detect the pedestrian from scratch. In an exemplary embodiment of the disclosure, image frames, where the pedestrian was tracked by the tracker algorithm but not detected by the detector algorithm can be used for training the detector algorithm to improve its detection rate based on image data recorded in the current working environment.

In an exemplary embodiment of the disclosure, cases of false positive identification (e.g. identifying objects that are not really there) can be filtered out with the help of the tracker algorithm, due to the fact that full scale object can't appear from nothing and disappear in the next frame. Optionally, detected false positive cases can also be used for training the detector algorithm at the processing unit.

Furthermore, consider heterogeneous sensory system 100 comprising sensors and processing units of two or more different types—e.g. the vision sensor and sonar sensor for providing a 3D map of the environment. Tracking the pedestrian with the vision sensor alone may be challenging in many cases. However the 3D map of the environment from the sonar sensor facilitates verification of segmentation, distance, and shape improving the reliability of the tracking and allowing object tracking for cases where the vision sensor alone would fail. Thus using more than one sensor can enhance the ability of tracking objects in frames of recorded data in which the objects are not detected, and in frames where the objects cannot be tracked based on information from a single sensor (e.g. based only on vision or only on a 3D map from a sonar sensor).

Such cases can be used for further training and improving the detector algorithm for situations where it failed to detect objects. Similarly false positive cases can be filtered out with the help of the tracker algorithm and post-processing, and then used to train and improve the detector algorithm.

In an exemplary embodiment of the disclosure, a home robot is trained to use a vision sensor to recognize family members, their objects, home pets, other objects of the house etc. Optionally, the home robot includes other sensory systems such as a RADAR, LIDAR, Stereo pair, cliff sensor, touch sensor, proximity sensor and other sensors.

The above examples may be generalized to other types of objects, applications, types of sensory inputs, etc.

In an exemplary embodiment of the disclosure, an autonomous vehicle system includes a vision sensor for analyzing the environment while driving along the road. Optionally, the vision sensor records the road in front of it and is programmed to identify pedestrians from the recorded input. The system is also programmed to be able to detect and recognize road signs, analyze the overall road situation and store the previous detected information and system states. Optionally, the system is equipped with other sensors, such as a RADAR based 3D scanner, providing a 3D map of the environment with complementary motion information.

In some embodiments of the disclosure, the vehicle system includes sensors that can be activated at various awareness levels. For example the pedestrian detection algorithm has a trade-off between false-alarms and miss detection. Optionally, the sensors can be applied at higher or lower frame-rates when sensing specific areas, for example the side of the road or the center of the road, or at smaller or larger distances ahead.

In an exemplary embodiment of the disclosure, applying a lower awareness level (e.g. smaller sensed area, lower frame rate, and closer distances) reduces the demand on computation resources and power consumption. Additionally, it will result in less false alarms but will potentially increase the miss rate or result in delayed detection of objects (e.g. a pedestrian). Likewise a higher awareness level will require more computational resources, can potentially produce more false alarms, and in the case of limited computational resources may require that the autonomous vehicle system reduce the speed of the vehicle to allow for more processing time for each meter along the road, without connection to any requirement of maintaining a speed that will allow the vehicle to break in time if necessary.

In a similar manner a higher awareness level of RADAR can mean using a higher pulse rate and/or a higher pulse energy being emitted by the RADAR, as well as a higher resolution level. A higher awareness level will then consume more energy and will provide a higher level of electromagnetic pollution in the environment at the RADAR frequency, causing possible concern to pedestrians, other drivers and other RADAR systems.

Following are some considerations for changing the awareness levels of various sensors:

1. Clear weather and environment—a high confidence level of the vision sensor may encourage reduction of the RADAR resolution, frame rate, pulse energy, or complete hibernation of the RADAR in certain conditions. On the contrary, heavy rain and reduced visibility may trigger elevation of the RADAR awareness level, its repetition rate, resolution and range.

2. Interstate roads and/or locations that are remote from towns and villages may reduce awareness of a pedestrian detection algorithm, likewise reduced awareness can reduce false alarms. In contrast an urban environment, traffic signs warning about schools, children crossing the road, road junctions or recently detected pedestrians may elevate awareness of pedestrian detection algorithms to a higher level.

3. Low confidence levels in some of the sensors or contradictions between the different sensors may justify increasing the awareness level of corresponding sensors and/or processing units.

In an exemplary embodiment of the disclosure, a combination of the sensor and a corresponding processing unit can be referred to as a sensory channel. For example a video camera is a vision sensor. Thus a vision based pedestrian detection system can be referred to as vision channel. Similarly a LIDAR sensor and a vehicle detector based on information from the LIDAR sensor can be referred to as a LIDAR channel.

The above examples can be generalized to other types of objects, applications, types of sensory inputs, etc.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

I claim:

1. A method of training a heterogeneous sensory system, comprising:
   receiving data of an environment from a first sensor;
   recognizing objects in the data from the first sensor by a first processing unit to identify specific objects;
   receiving data of the environment from a second sensor corresponding to the data from the first sensor;
   recognizing objects in the data from the second sensor by a second processing unit to identify specific objects;
   comparing the identified objects from the first processing unit and the corresponding objects from the second processing unit by a system processing unit;
   determining cases with discrepancies, between the objects identified in the data from the first sensor and not in the data from the second sensor or vice versa;
   tagging data that was received from the first sensor and data that was received from the second sensor and which are related to the cases with discrepancies as accurate or not accurate by said system processing unit;
   storing the tagged data in a training buffer;
   analyzing the discrepancies to conclude in each case if the first processing unit or the second processing unit was more accurate in recognizing and identifying an object as a specific object, by the system processing unit; and
   training the first processing unit and/or the second processing unit with the tagged data stored in the training buffer to accurately identify specific objects.

2. A method according to claim 1, wherein in each case the object identification from the sensor whose processing unit was more accurate and sensor data from the sensor whose processing unit was less accurate are used to train the processing unit that was less accurate.

3. A method according to claim 1, wherein at least one of the sensors and/or processing units have multiple levels of awareness and the levels of awareness are adjusted responsive to analysis of the data from the sensors.

4. A method according to claim 1, wherein in case of, a discrepancy checking current data of one of the sensors with previous data of the sensor to identify inconsistencies in tracking objects between the data of the sensor over time.

5. A method according to claim 4, wherein the objects are tracked forward in time from a state where it was last identified.

6. A method according to claim 4, wherein the objects are tracked backward in time from a state where it was first identified.

7. A method according to claim 4, wherein the objects are tracked using data from at least one more sensor.

8. A heterogeneous sensory system, comprising:
   a first sensor for accepting data of an environment;
   a first processing unit that receives the data from the first sensor and is configured for recognizing objects of the environment to identify specific objects;
   a second sensor for accepting data of the environment corresponding to the data of the first sensor;
   a second processing unit that receives the data from the second sensor and is configured for recognizing corresponding objects of the environment to identify specific objects;
   a system processing unit for comparing the identified objects from the first processing unit and the corresponding objects from the second processing unit;
   wherein the system processing unit is programmed to:
   (i) determine cases of discrepancies, between the objects identified in the data of the first sensor and not in the data of the second sensor or vice versa; and
   wherein the system processing unit is further programmed to tag data that was received from the first sensor and data that was received from the second sensor and which are related to the cases with discrepancies as accurate or not accurate by said system processing unit, and store the tagged data in a training buffer;
   (ii) analyze the discrepancies to conclude in each case if the first processing unit or the second processing unit was more accurate in recognizing and identifying an object as a specific object; and
   (iii) train the first processing unit and/or the second processing unit with the tagged data stored in the training buffer to accurately identify specific objects.

9. A system according to claim 8, wherein in each case the object identification from the sensor whose processing unit was more accurate and sensor data from the sensor whose processing unit was less accurate are used to train the processing unit that was less accurate.

10. A system according to claim 8, wherein at least one of the sensors and/or processing units have multiple levels of awareness and the levels of awareness are adjusted responsive to analysis of the data from the sensors.

11. A system according to claim 8, wherein in case of a discrepancy checking current data of one of the sensors with previous data of the sensor to identify inconsistencies in tracking objects between the data of the sensor over time.

* * * * *